United States Patent
Eidler et al.

[11] Patent Number: 5,591,538
[45] Date of Patent: Jan. 7, 1997

[54] ZINC-BROMINE BATTERY WITH NON-FLOWING ELECTROLYTE

[75] Inventors: Phillip A. Eidler, Muskego; Peter J. Lex, Wauwatosa, both of Wis.

[73] Assignee: ZBB Technologies, Inc., Wauwatosa, Wis.

[21] Appl. No.: 499,144

[22] Filed: Jul. 7, 1995

[51] Int. Cl.$^6$ ................................. H01M 6/00
[52] U.S. Cl. ................ 429/122; 429/199; 429/229; 429/105; 429/101; 29/623.1; 29/623.2
[58] Field of Search ..................... 429/199, 229, 429/105, 101, 122; 29/623.1, 623.2

[56] References Cited

U.S. PATENT DOCUMENTS

| | | | |
|---|---|---|---|
| 3,806,368 | 4/1974 | Maricle et al. | 136/6 R |
| 4,327,160 | 4/1982 | Jones et al. | 429/101 |
| 4,491,625 | 1/1985 | Kantner | 429/105 |
| 4,637,968 | 1/1987 | Grimes | 429/105 |
| 4,740,434 | 4/1988 | Hirota et al. | 429/105 |
| 4,818,642 | 4/1989 | Bellows et al. | 429/105 |
| 5,011,749 | 4/1991 | Manassen et al. | 429/101 |
| 5,188,915 | 2/1993 | Hashimoto | 429/199 |
| 5,308,718 | 5/1994 | Eidler et al. | 429/152 |

*Primary Examiner*—Bruce F. Bell
*Attorney, Agent, or Firm*—Godfrey & Kahn, S.C.; Derek C. Stettner; Nicholas A. Kees

[57] ABSTRACT

A battery including a plurality of bipolar electrodes and non-conductive separators, each having first and second surfaces. A carbon coating is applied on the first surface of each of the plurality of carbon plastic electrodes, and each separator is disposed in spaced, sandwich relation with respect to two of the plurality of electrodes. The electrodes and separators define a plurality of electrochemical cells, including a plurality of anodic half-cells, and a plurality of cathodic half-cells. A high surface area carbon material is disposed in, and completely fills, each cathodic half-cell, and an electrolyte is disposed in each half-cell. A spacer is disposed in each anodic half-cell. The spacer may be a mesh or screen made from polymeric material. The spacer may also be an aggregated glass mat.

21 Claims, 4 Drawing Sheets

ZINC-BROMINE BATTERY WITH NON-FLOWING ELECTROLYTE

BACKGROUND OF THE INVENTION

1. Field of the Invention

The present invention relates to zinc-bromine batteries. More particularly, the present invention relates to zinc-bromine batteries having a non-flowing electrolyte.

2. Description of the Prior Art

Zinc-bromine batteries are known in the art. Early zinc-bromine batteries included a plurality of electrodes disposed in a non-flowing, zinc-bromide aqueous solution, such as the battery disclosed in U.S. Pat. No. 3,806,368, issued to Maricle et al.

However, over time zinc-bromine batteries were developed as flowing electrolyte batteries. In such batteries, the electrolyte is circulated through a stack of electrochemical cells during charging and discharging, and is stored in external reservoirs. The main advantages of such batteries are that they have greater energy storage capacity than non-flowing batteries, the circulation of the electrolyte results in uniform zinc plating and improved thermal management of the system, and they have reduced self discharge. The term self discharge refers to the internal energy loss of a battery which occurs when a charged battery is stored. Even though a battery is not electrically coupled to a load, over time a battery will undergo a gradual loss of energy, and thus undergo self discharge. The term may also refer to the internal energy loss that occurs while a battery is discharged.

Flowing electrolyte, zinc-bromine batteries have an aqueous solution of zinc-bromide and quaternary ammonium salts, for example, methylethylpyrrolidinium bromide, with optional supporting salts, such as $NH_4 Cl$, which is circulated through the individual cells from external reservoirs. Each cell has two portions separated by a separator, one half of the cell contains an anolyte and the other half of the cell contains a catholyte. The anolyte flows through a common anolyte manifold to each anodic half cell and the catholyte flows through a parallel common catholyte manifold to each cathodic half-cell. In the anodic half cell, one surface of a bipolar electrode acts as an anode. In the cathodic half cell, one surface of another bipolar electrode acts as a cathode. The alternating separators and electrodes are sealed together in a manner which prevents communication between the anolyte and catholyte systems.

In the discharged state, the anolyte is substantially chemically identical to the catholyte. During the process of collecting a charge, the following chemical reaction takes place:

$Zn^{++} + 2 e^- \rightarrow Zn$ $2 Br^- \rightarrow Br_2 + 2 e^-$

Zinc is plated on the anode, and bromine is produced at the cathode. The bromine is immediately complexed by the quaternary ammonium ions in the electrolyte to form a dense second phase which is subsequently removed from the battery stack with the flowing electrolyte. Complexation of the bromine improves the safety of a zinc-bromine battery. As should be understood, elemental bromine is highly reactive. The dense, oily fluid, or second phase, formed by complexation has a lower vapor pressure and is less reactive than elemental bromine. When the battery is charged, zinc is stored on one side of each electrode and the complexed bromine is stored in the catholyte reservoir.

During the electrical discharge process, the following chemical reaction takes place.

$Br_2 + 2 e^- \rightarrow 2 Br^-$ $Zn \rightarrow Zn^{++} + 2 e^-$

In this reaction, zinc is oxidized, and the released electrons pass through the bipolar electrode where they combine with molecular bromine to form bromide ions. Further, the positively charged zinc ions travel through the separator and remain in solution, and at the same time, bromide ions pass through the separator in the opposite direction and remain in solution.

While flowing electrolyte batteries have certain advantages over non-flowing electrolyte batteries, they do have certain drawbacks. In particular, flowing electrolyte batteries are generally complex, and must include external pumps, reservoirs, and appropriate manifolds, by and through which the electrolyte is circulated.

While advanced zinc-bromine batteries have been developed as flowing electrolyte systems, if an improved non-flowing electrolyte battery could be developed, it would greatly simplify the construction of zinc-bromine batteries, and this benefit could, in certain applications, outweigh the drawback of reduced energy capacity of non-flowing electrolyte batteries.

Indeed, a non-flowing design would simplify a battery by eliminating the need for pumps and reservoirs. In addition, the overall weight of the battery would be reduced.

OBJECTS AND SUMMARY OF THE INVENTION

Therefore, it is an object of the present invention to provide a zinc-bromine battery with a non-flowing electrolyte.

A further object of the present invention is to provide a non-flowing electrolyte, zinc-bromine battery which approaches the performance of presently known flowing electrolyte batteries.

A further object of the present invention is to provide a non-flowing electrolyte, zinc-bromine battery which has a relatively high energy efficiency.

These and other objects and advantages are achieved in a battery of the present invention which includes a plurality of carbon plastic electrodes, each having a first surface and a second surface. A carbon coating is applied on the first surface of each of the plurality of carbon plastic electrodes. The present invention also includes a plurality of separators, each one disposed in spaced, sandwich relation with respect to two of the plurality of carbon plastic electrodes, and having first and second surfaces.

The electrodes and separators define a plurality of electrochemical cells. Specifically, the present invention includes a plurality of anodic half-cells, where each one is defined by the second surface of one carbon plastic electrode, and the first surface of one separator, and a plurality of cathodic half-cells, where each one is defined by the second surface of one separator, and the first surface of one carbon plastic electrode. A high surface area carbon material, which is soaked with an electrolyte, is disposed in, and completely fills, each cathodic half-cell. An electrolyte and a spacer are disposed in each anodic half-cell. The spacer may be a mesh or screen made from polymeric material. The spacer may also be an aggregated glass mat (AGM).

The electrolyte is a liquid electrolyte and, preferably, includes a salt such as 1-ethyl-1-methyl pyrrolidinium bromide, which forms a liquid bromine complex. Alternatively, the electrolyte may include a salt such as 1-ethyl-1-methyl morpholinium bromide or other salts that form a liquid bromine complex. The electrolyte may include a complexing agent such as diethyl-dimethyl ammonium bromide that forms a solid bromine complex.

A zinc-bromine battery of the present invention also includes at least two terminal electrodes each electrically coupled to the plurality of electrochemical cells. Each terminal electrode may include a thin strip of electrically conductive material which is capable of being electrically coupled to a load external to the battery.

DETAILED DESCRIPTION

Figure 1:
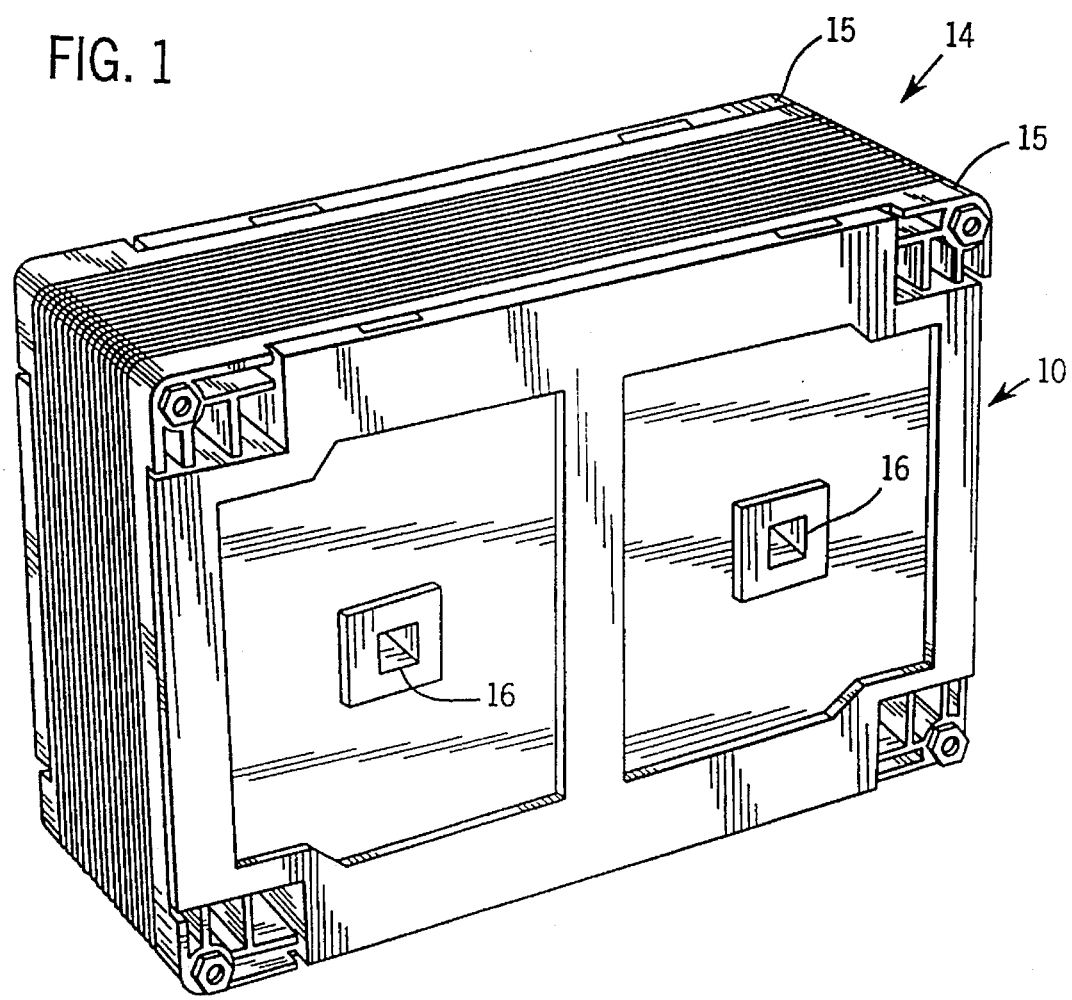
FIG. 1 is a perspective, environmental view of a battery of the present invention.

Referring more particularly to the drawings, a multi-cell electric energy device in the form of a zinc-bromine battery is designated generally by the numeral 10 in FIG. 1.

Figure 2:
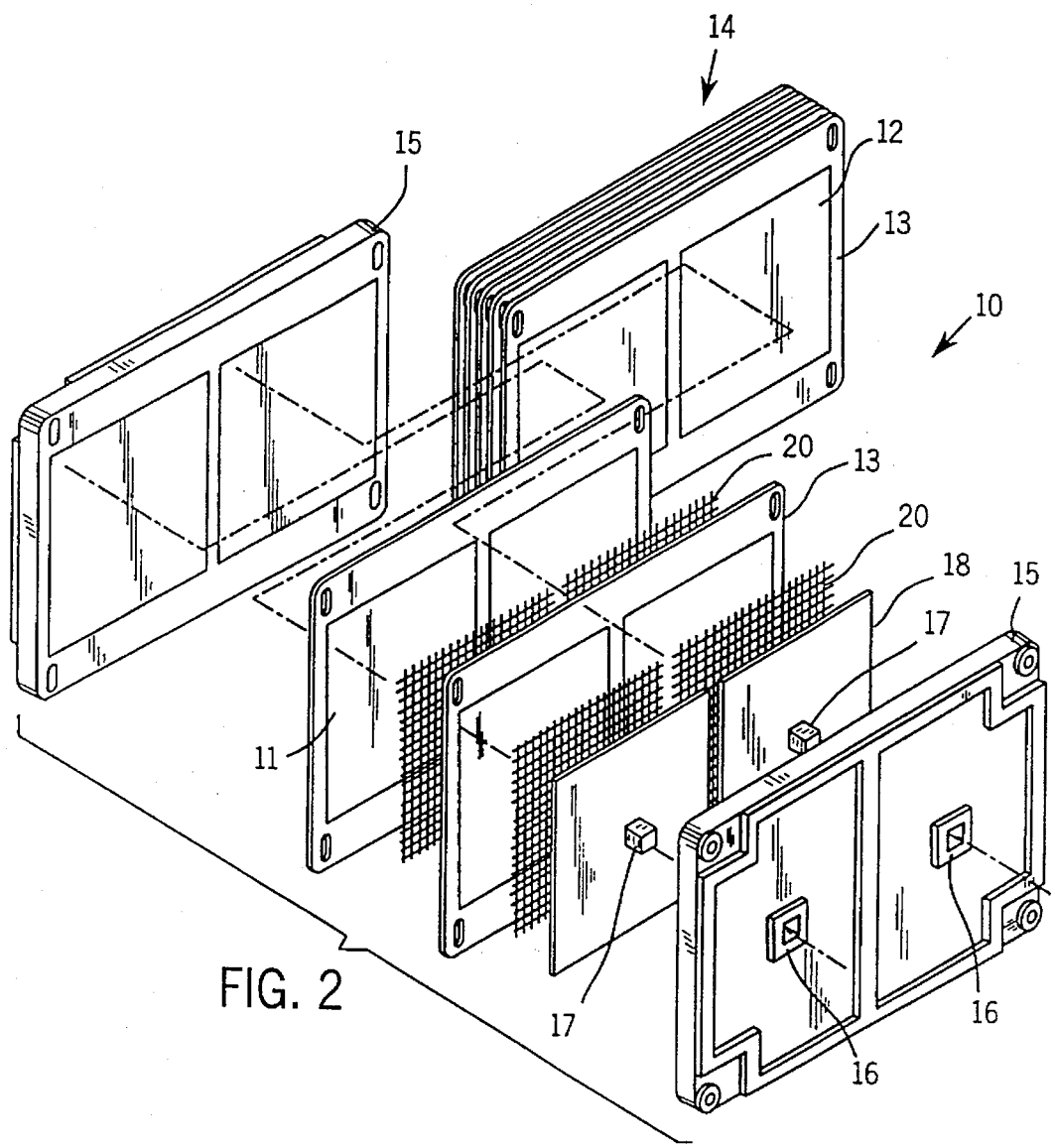
FIG. 2 is a perspective, exploded view of a stack of alternately disposed battery components.

As best seen by reference to FIGS. 1 and 2, the zinc-bromine battery 10 includes a series of carbon plastic electrodes 11 and non-conductive, plastic separators 12, mounted in plastic frames 13 which are affixed together, such as by welding, to form a stack 14 of electrochemical cells. The conductive electrodes 11 and non-conductive separators 12 may be mounted or otherwise secured in the individual frames 13, for instance, by infrared-type thermal welding or ultrasonic-type thermal welding.

Each battery 10 includes a predetermined number of electrodes 11 and separators 12 and, thus, a predetermined number of electrochemical cells. Respective endblocks 15 are disposed at each end of the battery 10 and may be constructed in accordance with the teachings of U.S. Pat. Nos. 5,308,718 and 5,002,841, which are hereby incorporated herein. The endblocks 15 each have a pair of openings 16. In each opening 16 an electrically conductive terminal strip 17 is positioned. The terminal strips are electrically coupled to the battery's terminal electrodes 18 which may be mounted directly adjacent to or on the endblocks 15. The terminal electrodes 18 may be constructed in accordance with the teachings of U.S. Pat. No. 4,948,681, which is hereby incorporated herein. The terminal strips provide a means through which current may enter and leave the battery. Each terminal electrode is capable of collecting current from, and distributing current to, the electrochemical cells of the battery. Although not shown, it should be understood that terminal electrodes are mounted on, or adjacent to, each endblock. Plastic meshes or screens 20 may be mounted on one surface of the electrodes 11.

As noted, the carbon plastic electrodes 11 are conductive. Carbon plastic electrodes 11 are formed using conventional techniques by mixing plastic powder or pellets and carbon powder in a compounder. The carbon-plastic mixture is then extruded or compression molded into sheets which have a thickness in the range of about 0.02 inches to about 0.03 inches, and preferably about 0.025 inches. Carbon plastic material of desired characteristics may be constructed using the teachings of U.S. Pat. No. 4,169,816, and U.S. Pat. No. 5,173,362, which are incorporated by reference herein.

Figure 3:
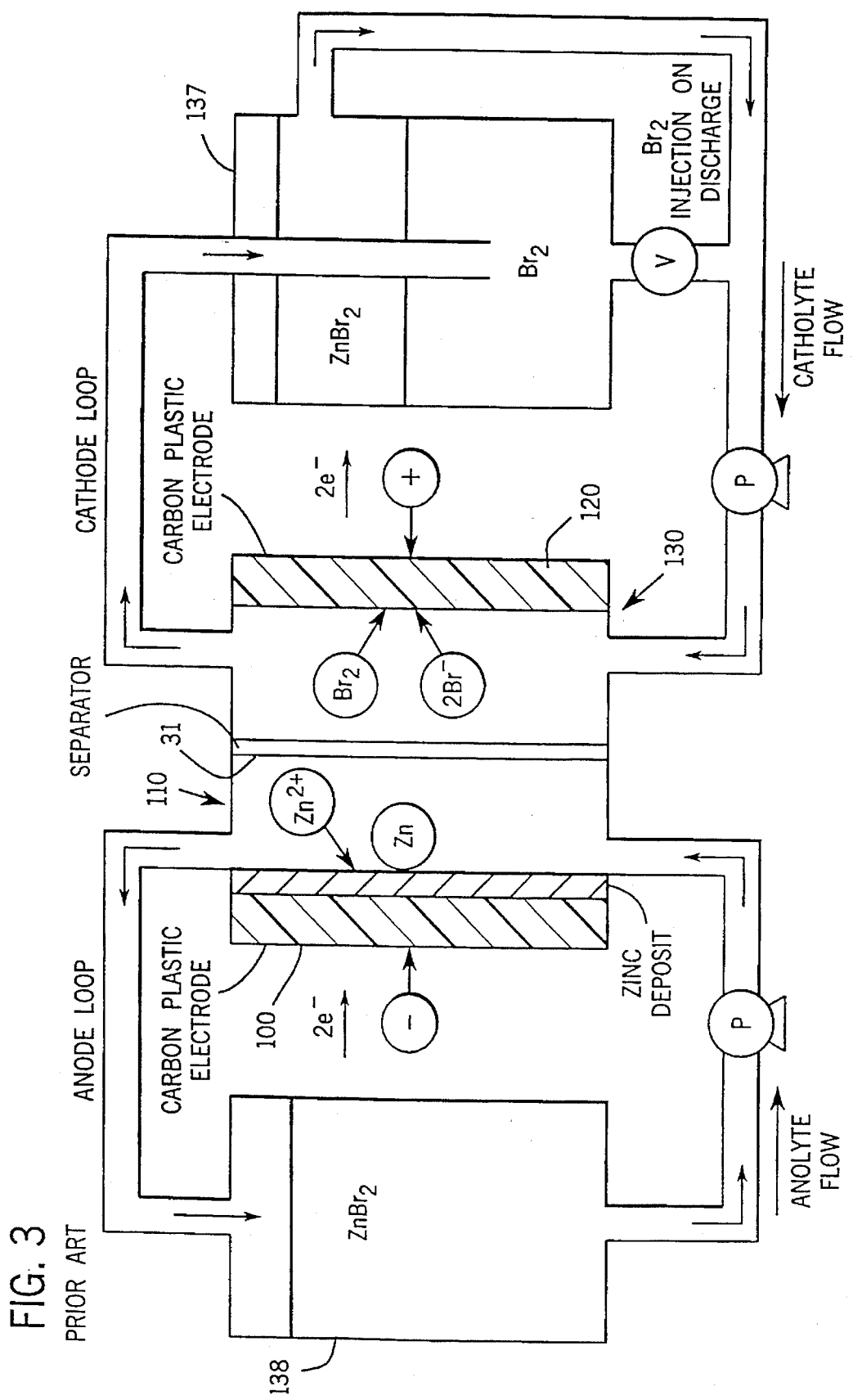
FIG. 3 is a schematic diagram of a prior-art, flowing-electrolyte, zinc-bromine battery cell showing electrolyte flow to and from the reservoirs of the battery.

Electron flow through a non-flowing electrolyte battery is similar to that in prior-art devices, such as the flow battery cell shown in FIG. 3, which shares some common components with a battery cell of the present invention and is described in detail for purposes of discussion.

As can be seen by reference to FIG. 3, during charge electron flow through the battery 10 results in zinc being plated on an anodic side of a bipolar, carbon plastic electrode, which for purposes of discussion is referred to as a zinc electrode 100. The zinc electrode 100 is located in an anodic half-cell 110. At the same time, bromine is evolved at a cathodic side of a bipolar, carbon plastic electrode, which for purposes of discussion is referred to as a bromine electrode 120. The bromine electrode 120 is located in a cathodic half-cell 130. Coupled in fluid flowing relation to the cathodic half-cell 130 is a catholyte reservoir 137. An anolyte reservoir 138 is coupled in fluid flowing relation to the anodic half-cell 110. As was noted above, during charge of a zinc-bromine battery bromine is produced on the bromine electrode 130 and immediately complexed to form a dense second phase which is removed with the flowing electrolyte and separated by gravity in the catholyte reservoir.

Figure 4:
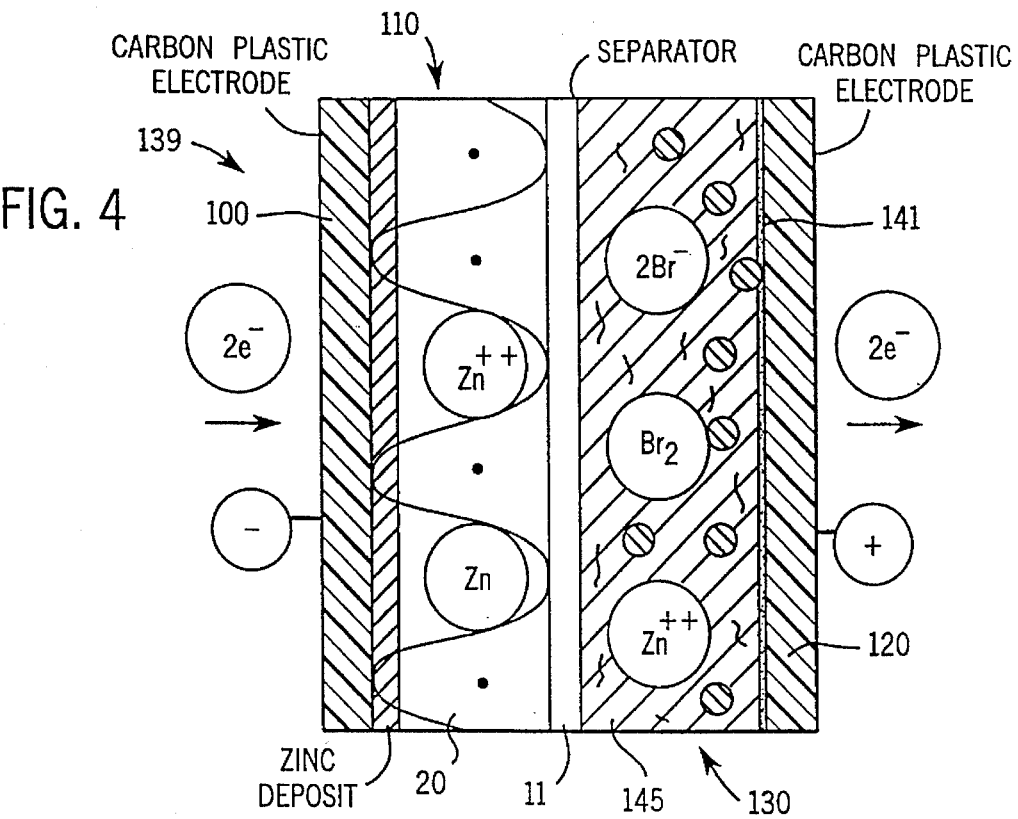
FIG. 4 is a schematic diagram of a non-flowing electrolyte, zinc-bromine battery cell showing electron travel through the battery, and the anodic half-cell of the battery having a polymeric screen disposed therein.

A non-flowing electrolyte, zinc-bromine battery cell 139 of the present invention is shown in FIG. 4. The cell includes a spacer disposed in the anodic half-cell 110 which may take the form of the plastic mesh or screen 20. The bromine electrode 120 is covered with a carbon coating 141, and disposed in the cathodic half-cell 130 is a high surface area carbon material 145. The high surface area carbon material 145 may be carbon cloth, carbon felt, carbon paper, or carbon paste. Preferably, the high surface area carbon material is a carbon felt commercially available from the Toyobo Corporation under the designation AS4 carbon felt.

The carbon coating 141 helps maintain good electrical contact between the bromine electrode 120 and the high surface area carbon material 145 in the cathodic half-cell 130. In addition, the carbon coating 141 improves the kinetics of the bromine-bromide reaction. It should be understood that the zinc-zinc ion reaction occurs at a faster rate than the bromine-bromide reaction, and that equalizing the rates of the two reaction improves battery performance.

It has been found, that a suitable carbon coating 141 may be formed by applying carbon particles to the surface of the electrode 120. The carbon coating 141 increases the surface area of the electrode 120. The active carbon particles may be applied to the electrode surface by means of an adhesive. It has been found that an adhesive under the tradename Eccocoat 258A, available from Emerson and Cuming, and another adhesive under the product number #W101894-3, available from Advanced Polymer Concepts, are suitable adhesives. The adhesive may be applied manually by rolling, brushing, or spraying it onto the surface of the electrode. The electrode is then placed in a tray filled with active carbon particles, or carbon powder, so that a layer of carbon particles, approximately 0.003 of an inch thick, is formed on its surface. In addition, the carbon powder may be sprinkled or sprayed on the surfaces of the electrode 120. The carbon covered electrode is then placed in a heated press and the carbon particles are hot-pressed into its surface. A carbon powder suitable for forming the carbon coating is available from the Calgon Carbon Corporation under the designation TOGLF 80x325.

In addition to applying carbon particles, the surface area of the conductive electrode inserts may also be increased by laminating a high surface area carbon cloth to its surface.

Figure 5:
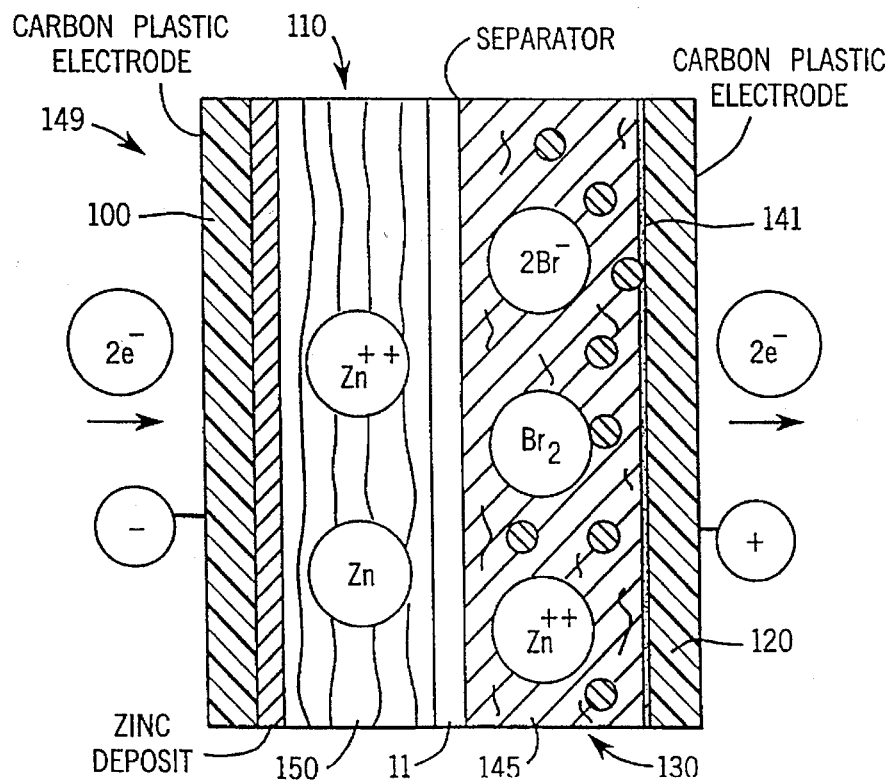
FIG. 5 is a schematic diagram of a non-flowing electrolyte, zinc-bromine battery cell showing electron travel through the battery and the anodic half-cell of the battery having an aggregated glass mat disposed therein.

Another non-flowing electrolyte, zinc-bromine battery cell 149 of the present invention is shown in FIG. 5. The cell includes a spacer 150 disposed in the anodic half-cell 110 which may take the form of an aggregated glass mat (AGM). Preferably, the spacer 150 is made from an AGM material which is commercially available from Hollingsworth and Vose Company under the designation BG-10017.

As with the plastic screen 20, the function of the spacer 150 is to maintain the electrolyte gap dimension in the anolyte side of the cells 139 and 149. The gap is about 0.02 to about 0.03 inches wide and is most preferred to be about 0.025 inches wide.

Disposed in each of the cells 139 and 149 is an electrolyte. In the cell 139, the electrolyte fills the anodic half-cell 110. In the cathodic half-cell 130, the high surface area carbon material 145 is soaked with electrolyte. The carbon in the carbon material 145 soaks up most of the electrolyte. In the cell 149, the electrolyte fills the anodic half-cell 110, but spacer 150, similar in form to fiberglass insulation, is disposed in the half-cell 110. The spacer 150 holds the electrolyte in its fibers.

As was noted, the electrolyte includes a complexing agent such as a quaternary amine. Specifically, morpholidinium, pyrrolidinium, and ammonium salts are suitable complexing agents. Salts, such as 1-ethyl-1-methyl morpholinium bromide or 1-ethyl-1-methyl pyrrolidinium bromide (MEP) are preferred. In particular, MEP is preferred. These types of complexing agents allow the battery to be discharged at a fairly high rate without a simultaneous large amount of self-discharge.

If the battery needs to have a low self discharge and it can be discharged at a lower rate, complexing agents such as diethyl-dimethyl ammonium bromide that form a solid bromine complex can be used.

Quaternary ammonium bromine salts which may be suitable for use in the present invention are listed in Table 1.

TABLE 1

| Chemical Name | Acronym |
| --- | --- |
| N-Methyl-N-ethylpyrrolidinium Bromide | MEP |
| N,N,N-Triethyl-N-propylammonium Bromide | TEPA |
| N-Ethyl-N-propylpyrrolidinium Bromide | EPP |
| N-Propyl-N-butylpyrrolidinium Bromide | PBP |
| N-Methyl-N-butylpyrrolidinium Bromide | MBP |
| N-Ethyl-N-(2-chloroethyl)pyrrolidinium Bromide | ECP |
| N-Methyl-N-hexylpyrrolidinium Bromide | MHP |
| N-Methyl-N-pentylpyrrolidinium Bromide | MPeP |
| N-Ethyl-N-pentylpyrrolidinium Bromide | EPeP |
| N-Ethyl-N-butylpyrrolidinium Bromide | EBP |
| Trimethylene-bis(N-methylpyrrolidinium)Dibromide | TBMP |
| N-Butyl-N-pentylpyrrolidinium Bromide | BPeP |
| N-Methyl-N-propylpyrrolidinium Bromide | MPP |
| N-Propyl-N-pentylpyrrolidinium Bromide | PPeP |
| N-Methyl-N-butylmorpholinium Bromide | MBM |

Electrolyte suitable for use in the present invention may have a composition of about 2.25M $ZnBr_2$, about 0.5M $ZnCl_2$, and about 0.8M MEP.

It should be understood that during normal operation, every battery has a predetermined polarity and the terminal strips in one endblock act as positive terminals and the terminal strips in the other endblock act as negative terminals. During discharge, charge flows from one endblock through an external load to the other endblock, from the positive terminals to the negative terminals. In order to charge the battery, a voltage is coupled across the terminal studs, from endblock to endblock. A voltage is applied to the terminal strips such that a high potential is applied at the positive terminals and a low potential is applied to the negative terminals. Charging of a battery is dependent on several factors. In a typical non-flowing zinc-bromine battery, each cell is designed to have an open circuit voltage of 1.8 volts per cell, and charging systems for such a battery are designed to limit the charge voltage to about 2.1 volts per cell. Charging is carried out using a DC voltage source, which is typically obtained through an AC converter. Depending on the charge current applied during charging it takes about 2 to about 3 hours to fully charge a typical battery. Preferably, charging is done at a relatively low current, generally about 10 to 20 amps/cm$^2$, and over a relatively long time. During charge, electric charges flow in a direction opposite to, or the reverse of, the flow of charges during discharge.

OPERATION

The battery of the present invention uses a bipolar electrode design with carbon plastic electrodes and non-conductive separators which are made from polymeric material, for example, silica-filled, high density polyethylene. The carbon plastic electrodes and separators are mounted into frames, and alternating electrode and separator frames are affixed together between terminal electrode endblocks to form a bipolar battery stack. Because electrolyte does not flow in a battery of the present invention, the endblocks used for such a battery need not be as thick as those used in flowing electrolyte batteries. The stack may be formed by using techniques such as vibration welding, ultrasonic welding, and infrared welding.

Though the battery design of the present invention has been shown with frames having a rectangular, side-by-side openings configuration, the design can be incorporated into a variety of geometrical configurations. Depending on the application, the battery could be square, rectangular, cylindrical or other shapes. In addition, three or more electrodes or separators could be mounted within the frames 12.

One of the features of the present invention is the high surface area carbon material 145. Though not fully understood, it appears that when forming bromine in the cathodic half-cell 130, the bromine is held by the carbon in the carbon material 145. This action appears to prevent the bromine from settling to the bottom of the cathodic half-cell and provides a relatively uniform layer of bromine at or near the surface of the bromine electrode 120. It is contemplated that the carbon coating 141 could possibly be modified so as to perform the function of the carbon material 145. Thus, what is of some importance to the present invention is that the cathodic half-cell contain a means for facilitating the formation of a relatively uniform layer of bromine at or near the surface of the bromine electrode 120 and which substantially inhibits the settlement of bromine toward the bottom of the cathodic half-cell 130.

It has been found that smooth zinc plating can be achieved, without the benefit of electrolyte circulation, by charging the battery of the present invention to a zinc loading of about 20 to about 50 mAh/cm$^2$. It has been found that a battery made in accordance with the present teachings should be charged and discharged at rates of about 20 mA/cm². At such rates, internal heating is reduced. Therefore, the need for a separate thermal management system is greatly reduced if not eliminated in a battery of the present invention. Further, it has been found that batteries made in accordance with the teachings of the present invention have achieved an 81% energy efficiency, but when the high surface area carbon material, spacer material; or complexing agent was removed from the battery, performance decreased.

While the invention has been herein shown and described in what is perceived to be the most practical and preferred embodiment, it should be recognized that departures may be made therefrom within the scope of the invention which is not to be limited to the illustrative details disclosed.

What is claimed is:

1. A non-flowing electrolyte, zinc-bromine battery comprising:

a plurality of carbon plastic electrodes, each electrode having a first surface and a second surface;

one or more separators, each said separator having a first surface and a second surface and each said separator disposed in spaced, sandwich relation with respect to two of the plurality of carbon plastic electrodes;

a carbon coating applied on the first surface of each of the plurality of carbon plastic electrodes;

one or more anodic half-cells, each defined by the second surface of one carbon plastic electrode, and the first surface of one separator;

one or more cathodic half-cells, each defined by the second surface of one separator, and the first surface of one carbon plastic electrode;

an electrolyte disposed in each half-cell; and a high surface area carbon material for facilitating the formation of a relatively uniform layer of bromine at or near the second surface of each carbon plastic electrode disposed in, and substantially completely filling, each cathodic half-cell;

wherein the plurality of carbon plastic electrodes and at least one separator form at least one electrochemical cell.

2. A non-flowing electrolyte, zinc-bromine battery as claimed in claim 1, wherein the electrolyte is a liquid electrolyte including N-ethyl-N-propylpyrrolidinium bromide.

3. A non-flowing electrolyte, zinc-bromine battery as claimed in claim 1, wherein the electrolyte includes a quaternary amine.

4. A non-flowing electrolyte, zinc-bromine battery as claimed in claim 1, and wherein the electrolyte is a liquid electrolyte including 1-ethyl-1-methyl morpholinium bromide which forms a complex with bromine.

5. A non-flowing electrolyte, zinc-bromine battery as claimed in claim 1, and wherein the electrolyte is a liquid electrolyte including 1-ethyl-1-methyl pyrrolidinium bromide which forms a complex with bromine.

6. A non-flowing electrolyte, zinc-bromine battery as claimed in claim 1, and wherein the electrolyte includes diethyl-dimethyl ammonium bromide which forms a solid complex with bromine.

7. A non-flowing electrolyte, zinc-bromine battery as claimed in claim 1, further comprising at least two terminal electrodes each electrically coupled to the at least one electrochemical cell.

8. A non-flowing electrolyte zinc-bromine battery as claimed in claim 7, wherein each terminal electrode includes a thin strip of electrically conductive material for electrically coupling a load to the battery.

9. A non-flowing electrolyte, zinc-bromine battery as claimed in claim 1, further comprising a spacer disposed in each of the anodic half-cells.

10. A non-flowing electrolyte, zinc-bromine battery as claimed in claim 9, and wherein the spacer is a mesh of polymeric material.

11. A non-flowing electrolyte, zinc-bromine battery as claimed in claim 9, and wherein the spacer is an aggregated glass mat.

12. A non-flowing electrolyte, zinc-bromine battery comprising:

a plurality of carbon plastic sheets capable of functioning as bipolar electrodes, each sheet having a first surface and a second surface;

one or more separators, each one disposed in spaced, sandwich relation with respect to two of the plurality of carbon plastic sheets, each having a first surface and a second surface;

one or more anodic half-cells, each defined by the second surface of one carbon plastic sheet, and the first surface of one separator;

one or more cathodic half-cells, each defined by the second surface of one separator, and the first surface of one carbon plastic sheet;

means disposed in each cathodic half-cell for facilitating the formation of a relatively uniform layer of bromine at or near the second surface of each carbon plastic sheet; and an electrolyte disposed in each half-cell wherein the plurality of carbon plastic sheets and at least one separator form at least one electrochemical cell.

13. A non-flowing electrolyte, zinc-bromine battery as claimed in claim 12, and wherein the electrolyte is a liquid electrolyte including 1-ethyl-1-methyl morpholinium bromide.

14. A non-flowing electrolyte, zinc-bromine battery as claimed in claim 12, and wherein the electrolyte is a liquid electrolyte including 1-ethyl-1-methyl pyrrolidinium bromide.

15. A non-flowing electrolyte, zinc-bromine battery as claimed in claim 12, and wherein the electrolyte includes diethyl-dimethyl ammonium bromide.

16. A non-flowing electrolyte, zinc-bromine battery as claimed in claim 12, further comprising at least two terminal electrodes each electrically coupled to the at least one electrochemical cell.

17. A non-flowing electrolyte, zinc-bromine battery as claimed in claim 16, wherein each terminal electrode includes a thin strip of electrically conductive material for electrically coupling a load to the battery.

18. A non-flowing electrolyte, zinc-bromine battery as claimed in claim 12, further comprising a spacer disposed in each of the anodic half-cells.

19. A non-flowing electrolyte, zinc-bromine battery as claimed in claim 18, and wherein the spacer is a mesh of polymeric material.

20. A non-flowing electrolyte, zinc-bromine battery as claimed in claim 18, and wherein the spacer is an aggregated glass mat.

21. A non-flowing electrolyte, zinc-bromine battery as claimed in claim 12, and wherein the electrolyte is a liquid electrolyte including N-ethyl-N-propylpyrrolidinium bromide.

* * * * *